UNITED STATES PATENT OFFICE 2,040,490

AGE RETARDER

Werner M. Lauter, Akron, Ohio, assignor to Wingfoot Corporation, Wilmington, Del., a corporation of Delaware No Drawing. Application September 18, 1931, Serial No. 563,663

6 Claims. (Cl. 18—50)

My invention relates to methods of preserving organic materials. More particularly it relates to methods of preserving rubber, balata and similar rubber-like substances.

An object of the invention is to provide a method of treating materials of the above indicated character whereby to retard the decay and resultant loss of tensile strength and elasticity thereof, occasioned by the attacks of atmospheric oxygen, sunlight and heat.

Another object is to provide a rubber product having the characteristics referred to.

Other objects and advantages will become apparent from the following descriptions.

Heretofore it has been observed that certain organic substances, such as reaction products of aldol and alpha naphthylamine, hydroquinone and similar substances, when incorporated in rubber, have the effect of retarding the action of oxygen, sunlight and heat which, under ordinary circumstances, cause premature decay and degeneration of rubber materials. Although many substances having similar age retarding properties are known to the industry, most of such materials heretofore employed for this purpose are objectionable for various reasons; for example, some of them are poisonous to the workmen employed in handling them and therefore, in order to use them in commercial practice, it has been necessary to take great precautions to overcome these effects. Still other materials are only mildly anti-oxidant in their properties or are objectionable because they can not be incorporated in the rubber except by subjecting the latter to excessive milling operations or because they are too expensive for commercial application.

My invention resides in the discovery that amino fluorenones and their derivatives, when incorporated in rubber, constitute excellent preservatives or age retarders for that material. As a specific example of a material of this class, attention is called to di-amino fluorenone having the formula

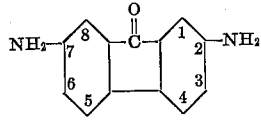

which may be prepared by the nitration of fluorene (a by-product obtained by the fractional distillation of coal tar) followed by subsequent reduction of the nitro groups to amino groups. In order to accomplish this reduction, the nitrated fluorene is intermixed with iron filings and then treated with a solution of 2 percent ammonium chloride in the presence of air. A more complete description of the preparation of the compound is contained in an article by Schmidt in Annalen, volume 390 starting on page 210. The diamino fluorenone may be extracted from the iron filings by dissolving it in a solution of hot benzene from which it may be obtained by evaporation. The compounds obtained in this manner may be added with satisfactory results to any of the ordinary rubber compounds. However, the following constitute examples of such materials in which they are found by actual experience to be particularly satisfactory.

Formula A

| | Parts |
|---|---|
| Pale crepe rubber | 100 |
| Zinc oxide | 5 |
| Sulfur | 3 |
| Hexamethylene tetramine | 1 |
| Stearic acid | 1.5 |
| Antioxidant | 1 |

Formula B

| | Parts |
|---|---|
| Smoked sheet rubber | 100 |
| Zinc oxide | 92.5 |
| Carbon black | .6 |
| Ferric oxide | .7 |
| Sulfur | 3.5 |
| Diphenylguanidine | .7 |
| Antioxidant | 5. |

Two sets of samples in which di-amino fluorenone was employed as the antioxidant were prepared in accordance with each of the above formulae. One set of samples prepared in accordance with Formula A was subjected to what is termed a "low temperature" accelerated age test, being placed in an oxygen bomb under a pressure of 150 pounds of oxygen per square inch and at a temperature of 50 degrees C. for a period of six days. At the conclusion of this period of artificial aging, it was then removed from the bomb and subjected to physical tests in order to ascertain the tensile strength and elasticity thereof.

A corresponding set of samples prepared in accordance with Formula B was subjected to what is termed a "high temperature" accelerated age test, being placed in a bomb charged with air under a pressure of 80 pounds per square inch at a temperature of 114 degrees C. for a period of 7 hours, after which it was removed from the bomb and subjected to physical tests to ascertain the tensile strength and elasticity thereof. The results of these tests together with corresponding physical tests conducted upon the remaining sets of samples which were not subjected to artificial aging but which were included for purposes of comparison, are tabulated as follows:

Formula A—Original

| Cure time in minutes | Temperature °F | Stress in kgs/cm.² at 500% elong. | Stress in kgs/cm.² at 700% elong. | Break | Elong. at break | Percent weight increase |
|---|---|---|---|---|---|---|
| 35 | 285 | 22 | 83 | 128 | 775 | |
| 50 | 285 | 29 | 115 | 156 | 750 | |
| 70 | 285 | 40 | 160 | 160 | 700 | |

Aged 6 days in oxygen bomb

| 35 | 285 | 28 | 104 | 149 | 765 | .07 |
| 50 | 285 | 39 | 146 | 158 | 710 | .32 |
| 70 | 285 | 49 | ------ | 161 | 675 | .14 |

Formula B—Original

| | | 300% | 500% | | | |
|---|---|---|---|---|---|---|
| 35 | 285 | 40 | 118 | 180 | 600 | |
| 50 | 285 | 45 | 130 | 233 | 645 | |
| 70 | 285 | 53 | 143 | 240 | 625 | |

Aged 7 hours in air bomb

| 35 | 285 | 54 | 134 | 142 | 515 | |
| 50 | 285 | 62 | 149 | 152 | 505 | |
| 70 | 285 | 93 | ------ | 122 | 430 | |

By comparison of the results obtained from the artificially aged samples and the unaged samples, it will be apparent that the samples containing the new antioxidant resist deterioration caused by oxygen to a remarkable degree even in the case where a temperature of 114 degrees C. is employed. In fact, the samples which were subjected to the low temperature age test at 50 degrees C. exhibited nearly as good physical properties as the unaged materials even after having been subjected to oxidation for a period of six days. A rubber stock containing no antioxidant, upon being subjected to similar conditions, is reduced to a resinous mass substantially void of tensile strength and elasticity.

It is to be understood that the invention is not limited to the use of di-amino fluorenone as an antioxidant but also includes the mono amino substituted compound and other poly amino substituted compounds as well as derivatives of the mono and poly amino materials. For example, it is possible to obtain excellent antioxidants by reacting either mono or poly amino substituted fluorenones with such aldehydes as formaldehyde, acetaldehyde, propionaldehyde, butyraldehyde, heptaldehyde, crotonaldehyde, aldol and acrolein. It is also practicable to react the material with the lower members of the aliphatic acid series such as formic acid. All of these materials may be employed with goods results in rubber compounds prepared in accordance with the preceding formulae or any compounds of similar character.

The formation of these aldehyde derivatives is illustrated by the following example:

Reaction product of amino fluorenone and butyr-aldehyde.

One mol of 2-amino fluorenone is treated with one mol of butyraldehyde, no solvent being used, and the reaction carried on at a temperature of about 150° C. until water ceases to be evolved. When water no longer appears in the short reflux condenser, under which the reaction is conducted, the reaction is completed and the reaction mass is allowed to cool. It consists of a brownish, resinous mass, which stiffens on cooling and has no definite melting point. The yield is practically quantitative and the reaction product may be used directly in rubber as an antioxidant.

These antioxidants are particularly desirable from a commercial viewpoint because the fluorene constituting the basic ingredient is obtained as a coal tar by-product for which there is little use at the present time. By nitrating, reducing and further reacting these otherwise useless materials with the aldehydes, excellent antioxidants which may be used in the manufacture of rubber are obtained in relatively large quantities. These antioxidants, in addition to being excellent preservatives of the rubber in which they are incorporated, are substantially non-odorous and non-toxic, are relatively soluble in rubber and may be incorporated in that material with ease.

Although I have illustrated but the preferred forms of the invention, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of preserving rubber which comprises subjecting it to vulcanization in the presence of a diprimary amino fluorenone.

2. A method of preserving rubber which comprises subjecting it to vulcanization in the presence of 2-7-di-amino fluorenone.

3. A rubber product that has been vulcanized in the presence of a di-primary amino fluorenone.

4. A rubber product that has been vulcanized in the presence of 2-7-diamino fluorenone.

5. A method of preserving rubber which comprises incorporating therein a compound from the group consisting of the mono primary amino fluorenones and the di-primary amino fluorenones.

6. A rubber product which has been vulcanized in the presence of a compound from the group consisting of the mono primary amino fluorenones and the di-primary amino fluorenones.

WERNER M. LAUTER.